United States Patent Office 3,321,364
Patented May 23, 1967

3,321,364
INSECTICIDAL COMPOSITION CONTAINING GROUND RYANIA AND DIMETHYL SULFOXIDE
Kenneth L. Kessler, La Habra, Calif., assignor to Leffingwell Chemical Company, Whittier, Calif., a corporation of California
No Drawing. Filed Oct. 5, 1964, Ser. No. 401,678
8 Claims. (Cl. 167—24)

This invention has to do generally with improved insecticidal compositions and their methods of use, employing as the active principle, the alkaloid Ryanodine derived from the ground stems and roots of species of genus Ryania. The ground stem of *Ryania speciosa* has been developed commercially both as insect contact and stomach poisons.

The invention is primarily concerned with assuring deposit on infested foliages of the Ryania alkaloid in a condition so related to the foliage and the insects as to have exceptional killing capacity. Use of this alkaloid has been restricted in the past by relatively high costs resulting, in part, from limitations in making effectively available the active alkaloid content of the ground Ryania stems. The present invention provides for materially increased effectiveness in rendering the extracted actives most efficiently useable in the final sprayable insecticidal composition and in insuring high kill levels.

This invention has for one of its major objects to provide for the ultimate goal of superior kill effectiveness by employing finely ground Ryania stems admixed with dimethyl sulfoxide, and in so doing, to gain outstanding advantages resulting from the properties displayed by the dimethyl sulfoxide in initially aiding water dispersion and also in assuring deposition on foliage of the actives in a condition so related to the foliage as to have exceptional kill capacity. In this latter respect, tests have indicated dimethyl sulfoxide to have exceptional retentiveness upon and penetratability into the foliage, with the result that the deposited alkaloids not only have assured surface availability to the insects, but the alkaloids may reach them also from within the foliage.

More particularly contemplated by the invention in one of its practices, is the preparation of an essentially flowable solid composition of the ground Ryania (e.g. finer than 30 mesh) and the dimethyl sulfoxide with an appropriate sweet or sugar bait, normally crystalline sugar, thus to provide a packageable concentrate to be mixed with water for field application. In such compositions, the dimethyl sulfoxide presents the additional advantages of an alkaloid activator that will tend not to agglommorate or cake with the Ryania and sugar, but instead, allow the admixture to maintain a flowable consistency.

Also contemplated by the invention is the preparation of a flowable solid composition of the ground Ryania with dimethyl sulfoxide, preferably with a wetting agent, to provide a packageable concentrate to be mixed with water for field application where the insects to be controlled are not affected by a sugar bait.

While the proportions of the components may vary considerably, it may be stated, in general, that the ingredients will be within the following weight proportion ranges: Ground Ryania (ryanodine 0.2% by weight) 10 to 90%, and, dimethyl sulfoxide 1 to 90% of the resultant mixture. Where bait is to be added, sugar may comprise 25% to 90% of its admixture with the Ryania and dimethyl sulfoxide. Then used as a contact insecticide, a surfactant may be added to any of the above mixtures in the range of 1% to 25% by weight of the total composition. Any water soluable surfactant may be used that will give equal distribution of insecticide. Illustrative surface active compounds are 4-dodecyclated oxydibenzene sulfonic acid, nonyl phenol polyethoxy ethanol, tridecyl phenol polyethoxy ethanol, alkyl polyoxy ethylene ethanol, dodecyl phenol polyethoxy ethanol, sodium lauryl sulfate, sodium-n-methyl-m-oleoyl taurate, sorbitan oleate, polyoxyethylene sorbitan momo laurate, sodium dioctyl sulfosuccinate, polyethylene glycol dicocate and polyethylene glycol hemioleate.

The following are examples of prepared Ryania and dimethyl sulfoxide mixtures:

*Example I*

|  | lbs. |
|---|---|
| Ground ryania | 7 |
| Dimethyl sulfoxide | 2 |

*Example II*

|  | lbs. |
|---|---|
| Ground ryania | 7 |
| Dimethyl sulfoxide | 0.2 |
| Sugar | 8 |

*Example III*

|  | lbs. |
|---|---|
| Ground ryania | 7 |
| Dimethyl sulfoxide | 0.2 |
| Alkylpolyoxyethylene ethanol | 0.2 |

The compositions below were tested by dilution in 100 gallons of water and applied at rate of approximately 100 gallons of spray mix to 100 trees. Each material was replicated two times. A precount was made by a thrips trap which showed a uniform count of 39 thrips per terminal of new growth. Also present was a heavy infestation of black citrus aphis.

Formula A—(Standard thrips control product to use in check):

| | | |
|---|---|---|
| Isopropyl alcohol | gal. | 0.6 |
| Sabadilla 70% interground with Vermiculite 30% | lb. | 1.0 |
| Methocel | lb. | .047 |
| Cab-O-Sil | lb. | .001 |
| Sorbitol | gal. | .055 |
| Water | gal. | .20 |
| | gal. | .88 |

½ gal.=5.1 grams Sabadilla alkaloid

Formula B:

| | | |
|---|---|---|
| Ryania (Ground) (Ryanodine 0.2%) | lbs. | 21 |
| Sugar—Granulated | lbs. | 30 |
| Alkylaryl polyoxyethylene glycol | pint | .6 |
| | lbs. | 51.6 |

14 lbs.=5.1 gms. Ryanodine

Formula C:

| | | |
|---|---|---|
| Ryania (Ground) (Ryanodine 0.2%) | lbs. | 21 |
| Sugar—Granulated | lbs. | 30 |
| Dimethyl Sulfoxide | pint | .6 |
| Alkylpolyoxyethylene ethanol (Surfactant) | pint | .6 |

The compositions above were applied and at the end of 13 days plate counts were made for the thrips population and inspection made to determine the residual infestation of aphis.

| Formula | Dosage per 100 gals. | Alkaloid per 100 gals. | Count 13 days | Percent reduction | Infestation aphis |
|---|---|---|---|---|---|
| A | ½ gal. | 10.8 gms. | 19.34 | 51.3 | Heavy. |
| B | 14 lbs. | 5.1 gms. | 2.36 | 94.1 | Light. |
| C | 14 lbs. | 5.1 gms. | .56 | 98.5 | Very light. |

Other comparisons have shown that dimethyl sulfoxide itself has very little effect on thrips population.

I claim:

1. The method of killing foliage insect infestations that includes applying to the foliage an aqueous uniform dispersion of ground Ryania and dimethyl sulfoxide.

2. The method of killing foliage insect infestations that includes applying to the foliage an aqueous uniform dispersion of ground Ryania, dimethyl sulfoxide and a surfactant.

3. The method of killing foliage insect infestations that includes applying to the foliage an aqueous uniform dispersion of ground Ryania, dimethyl sulfoxide and sugar.

4. The method of killing foliage insect infestations that includes applying to the foliage an aqueous uniform dispersion of ground Ryania, dimethyl sulfoxide, sugar, and a surfactant.

5. An insecticidal composition comprising about 10 to 90 weight percent of ground Ryania, uniformly admixed with about 1 to 90 weight percent of dimethyl sulfoxide.

6. An insecticidal composition comprising about 10 to 90 weight percent of ground Ryania, uniformly admixed with about 1 to 90 weight percent of dimethyl sulfoxide and 25 to 90 weight percent of sugar.

7. An insecticidal composition comprising about 10 to 90 weight percent of ground Ryania, uniformly admixed with about 1 to 90 weight percent of dimethyl sulfoxide and about 1 to 25 weight percent of a surfactant.

8. An insecticidal composition comprising about 10 to 90 weight percent of ground Ryania, uniformly admixed with about 1 to 90 weight percent of dimethylsulfoxide, about 25 to 90 weight percent of sugar, and 1 to 25 weight percent of a surfactant.

References Cited by the Examiner

UNITED STATES PATENTS

| | | | |
|---|---|---|---|
| 2,590,536 | 3/1952 | Heal | 167—24 |
| 2,726,188 | 12/1955 | Allison | 167—24 |
| 3,062,709 | 11/1962 | Ordas | 167—82 |
| 3,068,142 | 12/1962 | Bader | 167—82 |

ALBERT T. MEYERS, *Primary Examiner.*

JULIAN S. LEVITT, *Examiner.*

JEROME D. GOLDBERG, *Assistant Examiner.*